United States Patent [19]
Byrd

[11] 3,930,519
[45] Jan. 6, 1976

[54] PRESSURE REGULATOR

[75] Inventor: Joe L. Byrd, Huntsville, Ala.

[73] Assignee: The United States of America as represented by the Secretary of the Army, Washington, D.C.

[22] Filed: Feb. 13, 1975

[21] Appl. No.: 549,611

[52] U.S. Cl. ............................................ 137/505.25
[51] Int. Cl.² ........................................... F16K 31/12
[58] Field of Search ............................... 137/505.25

[56] References Cited
UNITED STATES PATENTS
3,372,707   3/1968   Dunn .............................. 137/505.25

*Primary Examiner*—Harold W. Weakley
*Attorney, Agent, or Firm*—Nathan Edelberg; Robert P. Gibson; William P. Murphy

[57] ABSTRACT

A fluid flow regulator including upstream and downstream members to secure a pierced diaphragm in fluid tight engagement therebetween, a valve stem and seat repectively disposed on the diaphragm and upstream member, an O-ring enclosed therein and, a shoulder on the valve stem for engagement with the O-ring to form a fluid tight seal. The diaphragm is disposed for flexure to compress the O-ring for engagement of the stem and seat to discontinue fluid flow responsive to a predetermined value of downstream fluid pressure.

2 Claims, 1 Drawing Figure

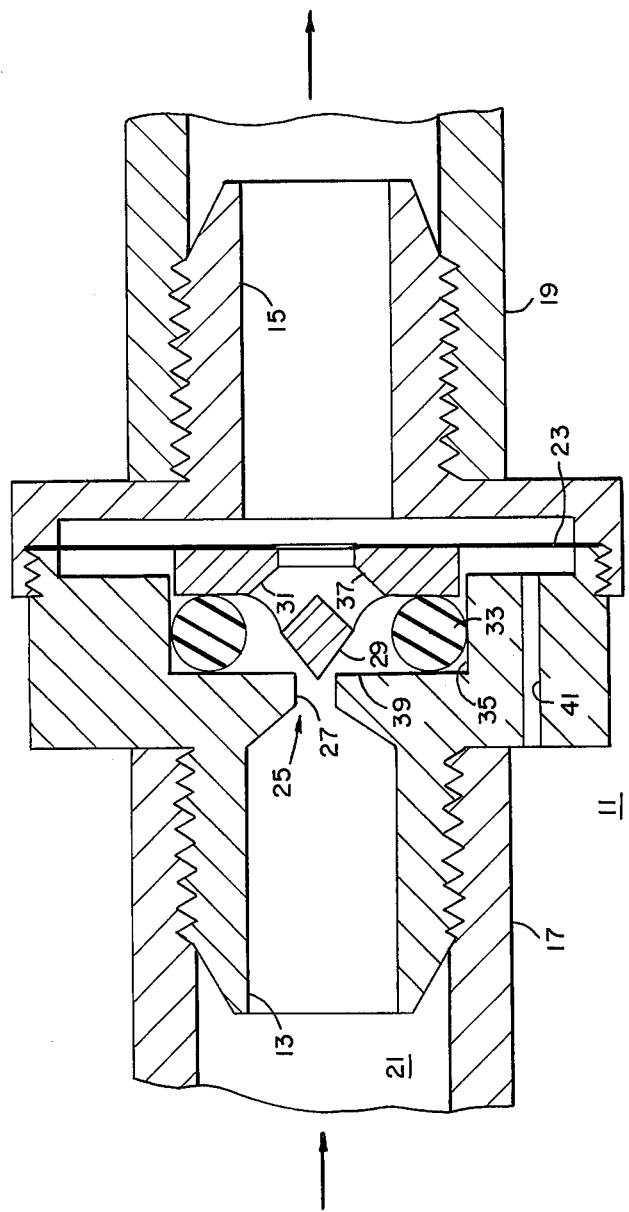

PRESSURE REGULATOR

SUMMARY OF THE INVENTION

This regulator conbines a minimum of components including some with multiple functions such as the O-ring that seals and biases the valve stem and the valve stem that transmits pressure to the O-ring as well as engages the seat to discontinue flow in the conduit to combine structural simplicity with short valve stroke operation for overall compactness of the device.

BRIEF DESCRIPTION OF THE DRAWING

The single view is a cross-section of sections of a conduit with the regulator secured therebetween.

DESCRIPTION OF THE PREFERRED EMBODIMENT

A regulator 11 is provided with tubular members 13 and 15 respectively secured to upstream and downstream sections 17 and 19 of a conduit 21. Members 13 and 15 are disposed for engagement to secure a diaphragm 23 in fluid tight engagement therebetween. An axial valve 25 is provided with a seat 27 disposed on member 13 and a stem 29 secured to diaphragm 23. A fluid passage 31 extends through stem 29 and diaphragm 23. An O-ring 33 is circumferentially restrained in a cylindrical cavity 35 in member 13 for initial compression against cavity surface 39 by a shoulder 37 of stem 29 to bias the stem from member 13 and provide a fluid tight seal therebetween. An air vent aperture 41 is provided in member 13.

Diaphragm 23 is disposed to flex for additional compression of O-ring 33 and engagement of stem 29 with seat 27 to discontinue flow in conduit 21 responsive to a predetermined value of fluid pressure in downstream section 19.

I claim:

1. A regulator for control of fluid flow between upstream and downstream sections of a conduit comprising:

a circular diaphragm with an axial valve stem secured thereto including a passage for flow of fluid therethrough, a pair of tubular members disposed for respective engagement with said sections and for mutual engagement to conduct the flow between the sections and to secure said diaphragm therebetween in fluid tight engagement, an axial valve seat disposed on said upstream member and said upstream member including a cylindrical cavity; and an O-ring circumferentially constrained in said cavity for initial compression by said stem to provide a fluid tight seal and bias said stem from said seat;

said diaphragm being disposed to flex for additional compression of said O-ring and engagement of said stem with said seat to discontinue flow through said axial passage responsive to a predetermined value of fluid pressure in said downstream section.

2. A regulator as in claim 1 with a shoulder provided on said stem for the compression of said O-ring and with said upstream member including an aperture to vent air therefrom.

* * * * *